Nov. 9, 1954  R. A. COLEMAN ET AL  2,693,970
TRAILER HITCH LOCKING DEVICE
Filed Aug. 14, 1953                                        2 Sheets-Sheet 2
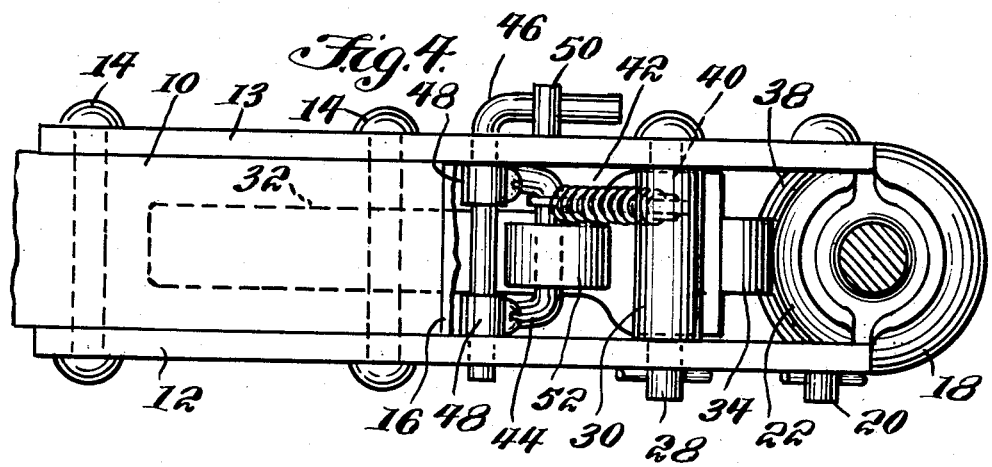
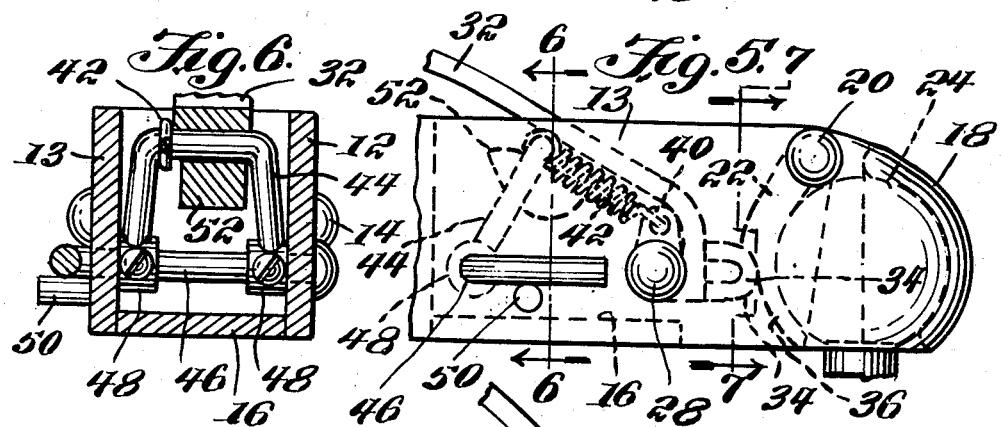
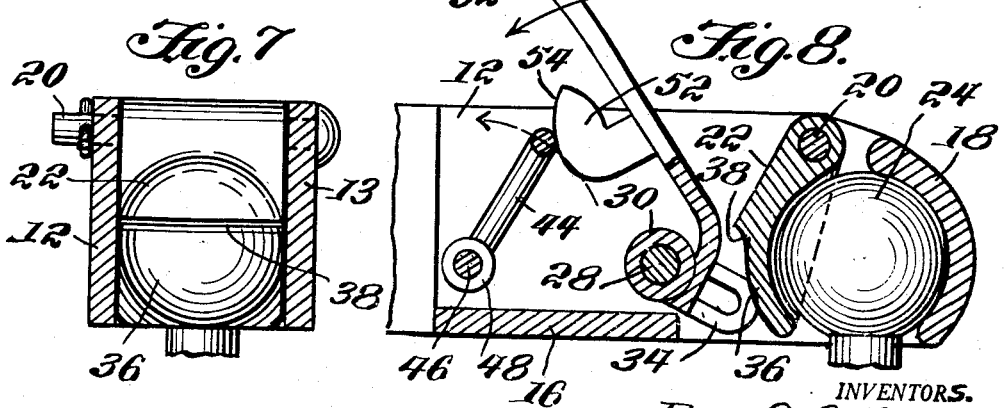
INVENTORS.
Roy A. Coleman,
Albert P. Watters,
BY McMorrow, Berman + Davidson
Attorneys.

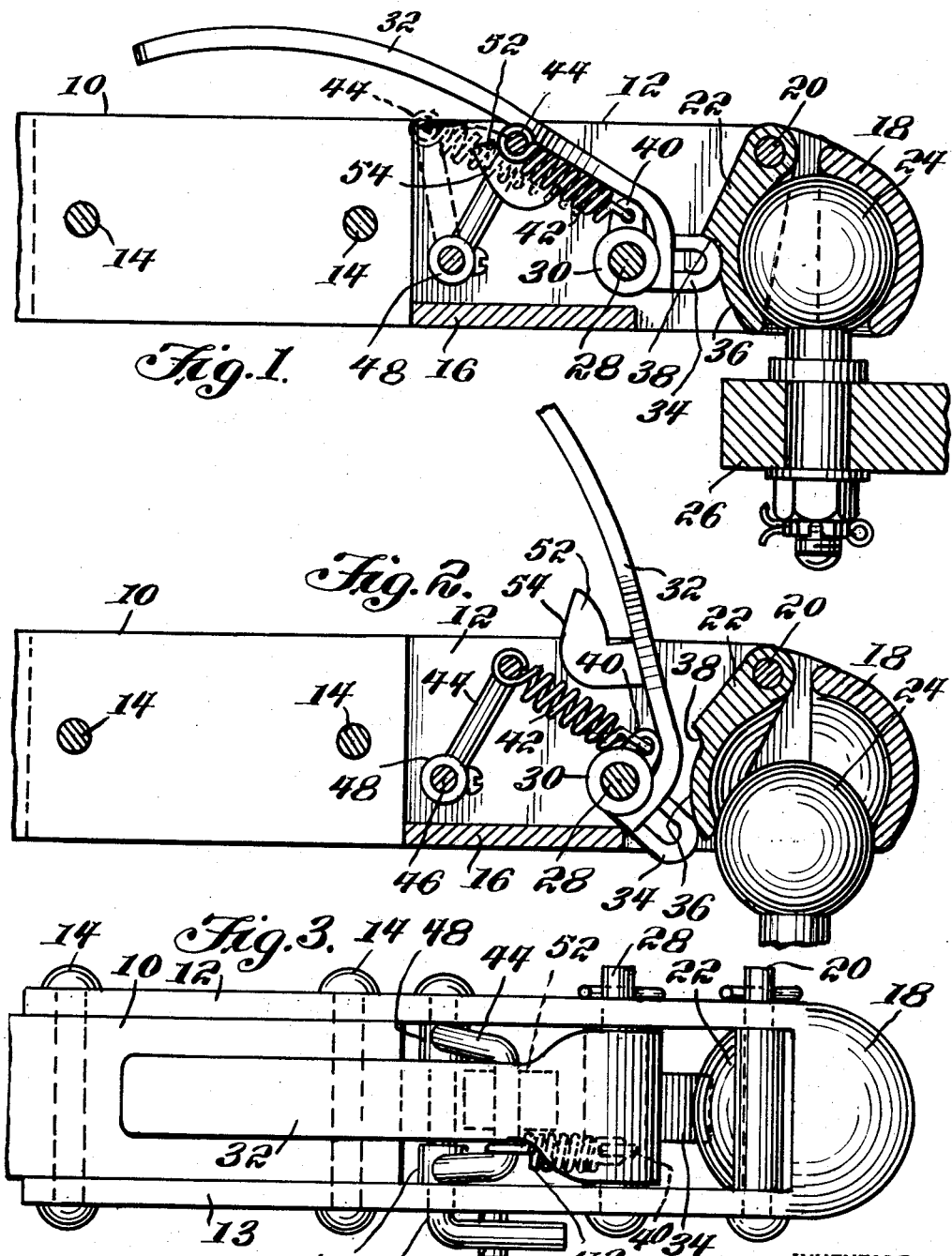

United States Patent Office 2,693,970
Patented Nov. 9, 1954

2,693,970

TRAILER HITCH LOCKING DEVICE

Roy A. Coleman and Albert P. Watters,
Oklahoma City, Okla.

Application August 14, 1953, Serial No. 374,232

3 Claims. (Cl. 280—512)

This invention relates to trailer hitches or coupling devices, and more particularly has reference to a lock means for a trailer hitch of the ball and socket type.

It is of course desirable that a trailer hitch of the type referred to above be so designed as to be equipped with a locking means which can be readily shifted to an unlocked position, in a manner that will permit the component parts of the trailer hitch to be swifty disconnected. At the same time, it is desirable that the locking means be so designed as to be swiftly set in locking position, when the ball is to be engaged in its associated socket.

The broad object of the present invention is to provide a generally improved locking device for trailer hitches which will be so designed as to permit connection or disconnection of the component parts of the hitch with speed and facility, while at the same time assuring that the hitch portions will be secured and locked against separation when the hitch is in use.

Another object of importance is to provide a hitch wherein the locking action will occur merely by throwing of a locking handle in one direction, the locking handle being shiftable to a position in which all the parts of the lock assembly will be securely held against relative separation.

A further object of importance is to provide a means adapted to insure that when the handle is in locking position, it will be so disposed as to prevent movement of the portions of the ball socket out of engagement with the ball received therebetween.

Yet another object is to provide a locking device for a trailer hitch in which the locking handle will be provided with spaced cam means, one of which will engage a movable portion of the ball socket to bias said portion in the direction of a fixed ball socket portion, to engage both portions about a ball received therebetween, the other cam means being so designed as to initially bias a locking yoke in a direction away from the handle, with the locking yoke subsequently being urged by spring action back toward the handle to lock the handle against movement from its locking position.

Yet another object is to provide, in association with the locking yoke, a release handle which can be readily swung through a comparatively short path of movement, to disengage all the parts and free the handle for swinging movement to its unlocked position.

Other objects will appear from the following description, the claims appended thereto, and from the annexed drawings, in which like reference characters designate like parts throughout the several views, and wherein:

Figure 1 is a longitudinal sectional view through a hitch formed in accordance with the present invention, in which the parts are shown in locking position, the dotted lines showing the released position of the locking yoke;

Figure 2 is a view similar to Figure 1 in which the parts are in their unlocked position, preliminary to engagement of the ball in its associated socket and locking of the ball in place within the socket;

Figure 3 is a top plan view;

Figure 4 is a bottom plan view in which portions have been broken away;

Figure 5 is a fragmentary side elevational view with the parts in their locked position;

Figure 6 is a transverse sectional view taken substantially on line 6—6 of Figure 5;

Figure 7 is a transverse sectional view taken substantially on line 7—7 of Figure 5; and Figure 8 is a fragmentary longitudinal sectional view in which the parts are shown in an intermediate position.

The reference numeral 10 has been applied in the several figures of the drawings to a rectangular, solid block, to the opposite side surfaces of which are secured side plates 12, 13, said side plates being secured to the block by means of bolts 14 extending through the side plates and the block, at locations spaced longitudinally of the side plates and block.

The side plates are of such a length as to project a substantial distance beyond one end of the block, and to prevent movement of the projecting portions of the side plates toward one another, we provide a bracing plate 16, disposed between the side plates beyond said end of the block. The plate 16 can be fixedly secured in any suitable manner, as by welding, to the inner surfaces of the side plates, and is disposed adjacent the bottom edges of the side plates as best shown in Figures 1 and 2.

Those ends of the side plates remote from the block 10 are connected by a fixed ball socket portion 18. The ball socket portion 18, in the illustrated example, is integral with the side plates, but it will be understood that the ball socket portion could be fixedly secured to and between the side plates in any other suitable manner, as by welding or equivalent means. In any event, the ball socket portion 18 is formed as a segment of a sphere, and cooperates with a complementarily formed, movable ball socket portion in engaging a conventional ball of a trailer hitch.

To mount the movable ball socket portion, we provide a hinge pin 20, the ends of which are extended through transversely aligned openings formed in the side plates 12, 13. After the hinge pin has been extended through the openings of the side plates, a cotter key or the like can be used to hold the hinge pin against accidental separation from the side plates.

The hinge pin 20 extends through an opening formed in one end of the movable ball socket portion 22, said movable ball socket portion having a spherically shaped inner surface complementing the inner surface of the portion 18, for engagement of a ball 24 between the respective ball socket portions. When the portion 22 is swung toward the portion 18, as in Figure 1, the ball 24 will be securely held therebetween, so as to permit the hitch to be used during the traction of a vehicle. At the same time, the ball will, of course, be rotatable relative to its associated socket defined by the portions 18, 22, thus to permit the desired universal movement that is conventional in trailer hitches of the type most widely used to date.

The ball 24, as will be understood, is a part of a conventional trailer hitch assembly designated generally by the reference numeral 26, the ball hitch assembly 26 being normally secured fixedly to the traction vehicle.

Extending between the side plates 12, 13, in closely spaced relation to the movable ball socket portion 22, is a pivot pin 28, the ends of which are engaged in transversely aligned openings provided in the side plates. Rotatable upon the pin 28 is a sleeve 30, and fixedly secured to said sleeve is an elongated handle 32, the free end portion of the handle projecting out of the space between the side plates, and terminating above the block 10, when the parts are in the locking position shown in Figure 1.

The inner end of the handle, that is, that end of the handle secured fixedly to the sleeve 30, has a cam projection 34, said cam projection being adapted to bias the ball socket portion 22 in the direction of the portion 18 when the handle is swung in a counterclockwise direction about the axis defined by the pivot pin 28. This movement is shown to particular advantage in Figures 2 and 8, and it will be noted that initially, the projection 34 is disposed at the lower or free end of the portion 22. When the handle is swung in the direction of the arrows shown in Figure 8, the portion 34 will exert a cam action against the portion 22, biasing the same in the direction of the fixed portion 18. Ultimately, the portion 34 will come to rest against a shoulder 38 formed upon the outer surface of the movable ball socket portion 22 intermediate the opposite ends thereof.

An ear 40 is fixedly secured to the sleeve 30, and projects thereabove, and is formed with an aperture in which is hooked one end of a coil spring 42. The other end of the coil spring is engaged about the bight portion of a locking yoke 44 of inverted U-shaped disposed between the side plates 12, 13. The locking yoke 44 is made rigid with a release handle 46, and reference should now be had to Figure 4, wherein it is seen that the release handle is of L-shape, with a horizontally disposed leg rotatable in transversely aligned openings provided in the side plates 12, 13. Set collars 48 are secured to the horizontally disposed leg of the release handle 46, and are integrally provided upon the free ends of the legs of the locking yoke 44 (Figure 6). In this way, the locking yoke 44 can be adjusted to a selected position, after which the set screws provided in the collars 48 can be turned home against the horizontal leg of the release handle 46, thereby to fixedly secure the locking yoke to said release handle.

The release handle has, in addition to the horizontal leg, a handle portion disposed exteriorly of the space between the side plates 12, 13. The handle portion of the release handle is engageable, when swung in one direction, against a stop pin 50 projecting outwardly from the side plate 13. This limits swinging movement of the locking yoke 44 in the direction of the ball socket, the locking yoke normally being swung in said direction by the tendency of the spring 42 to contract.

Fixedly secured to the intermediate portion of the handle 32 is a hook 52, the hook depending from the underside of the handle and having a cam surface 54 formed thereupon. As shown in Figure 8, the cam surface 54 is so disposed as to engage the bight of the locking yoke 44, when the handle 32 is swung in the direction of the arrow in Figure 8. As a result, the locking yoke will be biased, against the opposing action of the spring 42, in a direction away from the ball socket, this direction of movement of the locking yoke being shown by the arrow in Figure 8. At the same time, the cam projection 34 of the handle 32 is biasing the ball socket portion 22 inwardly toward the fixed ball socket portion 18.

Ultimately, as the cam projection 34 comes to rest against the shoulder 38, the bight portion of the locking yoke 44 rides off the cam surface 54, and moves into the recess defined between the hook 52 and the adjacent portion of the handle 32.

The arrangement illustrated and described herein has certain important characteristics, which are believed worthy of note. The locking of the ball socket portions about the ball 24 associated therewith is accomplished merely by a single throw of the handle 32. Heretofore, it has been necessary in many instances that a rotatable lock member be provided, with said lock member being rotated to its maximum extent before the ball can be considered as being effectively locked. In the present invention, however, movement of the handle 32 to the position shown in Figure 1 will necessarily insure that the ball will be locked between the portions 18, 22, since the handle 32 cannot move to the Figure 1 position until the movable ball socket portion 22 is engaged directly against the ball 24.

At the same time, when the handle 32 moves to the position shown in Figure 1, it is necessarily locked against retrograde movement, since the bight of the locking yoke 44 will have moved into the space between the hook 52 and the handle 32, under the contractile tendency of the spring 42.

Subsequently, when it is desired to disengage the parts, it is merely necessary that the release handle 46 be grasped, and thrown upwardly. This will cause the locking yoke 44 to be moved to the dotted line position shown in Figure 1, thereby permitting the handle 32 to be shifted upwardly to the position shown in Figure 2. In this position, the movable ball socket portion 22 will shift away from the fixed portion 18, thereby to permit the ball 24 to be disengaged from its associated socket.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A trailer hitch locking device comprising: a frame; fixed and movable ball socket portions carried thereby and adapted for engaging a ball between them on shifting of the movable portion toward the fixed portion; a handle pivoted on said frame; cam means on the handle arranged for biasing the movable portion toward the fixed portion on swinging of the handle in one direction; a hook on the handle; a U-shaped locking yoke pivotally mounted on the frame and swingable in a direction to engage the bight thereof with said hook when the handle is swung in said direction, thus to hold the handle against retrograde movement; and resilient, yielding means connected between the locking yoke and handle and tensioned to urge the locking yoke in said direction thereof.

2. A trailer hitch locking device comprising: a frame; fixed and movable ball socket portions carried thereby and adapted for engaging a ball between them on shifting of the movable portion toward the fixed portion; a handle pivoted on said frame; cam means on the handle arranged for biasing the movable portion toward the fixed portion on swinging of the handle in one direction; a hook on the handle; a U-shaped locking yoke pivotally mounted on the frame and swingable in a direction to engage the bight thereof with said hook when the handle is swung in said direction, thus to hold the handle against retrograde movement; and resilient, yielding means connected between the locking yoke and handle and tensioned to urge the locking yoke in said direction thereof, said resilient means being adapted to normally dispose the locking yoke in the path of the hook during swinging of the handle in said one direction thereof, the hook having a cam surface thereon adapted to bias the locking yoke in a direction away from the handle temporarily during swinging of the handle in said one direction thereof, said locking yoke moving into engagement with the hook subsequent to passage of the bight of the yoke off the cam surface of the hook.

3. A trailer hitch locking device comprising: a frame; fixed and movable ball socket portions carried thereby and adapted for engaging a ball between them on shifting of the movable portion toward the fixed portion; a handle pivoted on said frame; cam means on the handle arranged for biasing the movable portion toward the fixed portion on swinging of the handle in one direction; a hook on the handle; a U-shaped locking yoke pivotally mounted on the frame and swingable in a direction to engage the bight thereof with said hook when the handle is swung in said direction, thus to hold the handle against retrograde movement; and resilient, yielding means connected between the locking yoke and handle and tensioned to urge the locking yoke in said direction thereof, said resilient means being adapted to normally dispose the locking yoke in the path of the hook during swinging of the handle in said one direction thereof, the hook having a cam surface thereon adapted to bias the locking yoke in a direction away from the handle temporarily during swinging of the handle in said one direction thereof, said locking yoke moving into engagement with the hook subsequent to passage of the bight of the yoke off the cam surface of the hook, the locking yoke having a release handle rigid therewith for disengaging the locking yoke from the hook.

References Cited in the file of this patent

UNITED STATES PATENTS

| Number | Name | Date |
| --- | --- | --- |
| 1,591,659 | Corwin | July 6, 1926 |
| 1,757,009 | Dumond | May 6, 1930 |
| 2,125,611 | Hennicke | Aug. 2, 1938 |
| 2,399,746 | Klaus et al. | May 7, 1946 |
| 2,613,948 | Klein | Oct. 14, 1952 |